United States Patent Office 3,503,256
Patented Mar. 31, 1970

3,503,256
APPARATUS FOR MONITORING THE MECHANICAL AND THERMAL STRESS ON INTERNAL COMBUSTION ENGINES
Hans List, 126 Heinrichstrasse, Graz, Austria, and Reimar Germann, Graz, Austria; said Germann assignor to said List
Filed Nov. 25, 1968, Ser. No. 778,612
Int. Cl. G01m *15/00*
U.S. Cl. 73—115
8 Claims

ABSTRACT OF THE DISCLOSURE

Apparatus for the monitoring of the mechanical and thermal stress on internal combustion engines and of the uniform load distribution among their cylinders. Pressure measurements of the various cylinders of the engine are shown either individually or collectively on the screen of an oscillograph.

---

Figure 1:
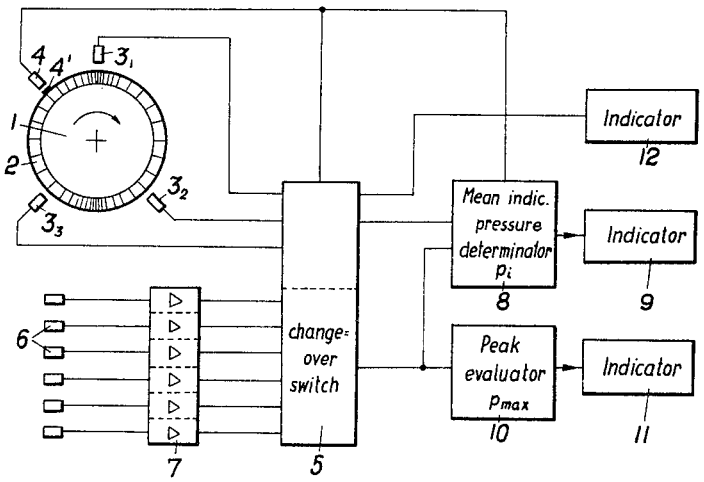

The invention relates to an apparatus for the monitoring of the mechanical and thermal stress on internal combustion engines and of the uniform load distribution among their cylinders.

Continuous monitoring of multi-cylinder engines, particularly of diesel and gas engines, is desirable in order to be able to ascertain operational defects already before major damage has been done. In addition, it is necessary to find out whether the mechanical and thermal stresses are kept within tolerable limits, whether they are approximately equal for each of the cylinders, and in the case of gas engines, whether objectionable peak pressures are caused by knocking in the cylinders. It is furthermore important to continuously observe the uniform distribution of load among the cylinders of the engine, and in particular, to see whether any of the cylinders fail to operate or to fully deliver their rated output.

Thus far, partial solutions only have been devised for these problems whereas dependable and at the same time economic monitoring has appeared unattainable in view of the multitude of measured values to be considered and of the shortcomings of the control instruments formerly used for that purpose.

For example, a known design provides for the equipment of internal combustion engines with magnetostrictive pressure transducers structurally combined with the spark plugs and releasing their measuring voltages by means of an interposed switchgear to an oscillograph. The measuring curves corresponding to the pressure dis-stribution in the various cylinders of the internal combustion engine show either individualy or collectively on the screen of the oscillograph, depending on the switch of the switchgear being closed, thereby permitting visual comparison between the various pressure curves. However, this system of monitoring the operating conditions of an internal combustion engine is far from perfect, since it fails to reveal further measured values which are indispensable for the evaluation of the conditions to be examined.

Furthermore, an output indicator is known to be used in connection with piston-type engines, wherein the cylinder pressure of each engine cylinder is measured by means of pressure transducers selectively connectable via a multipolar switch to a measuring amplifier. As a second value the speed of the internal combustion engine is measured by means of an electric speed indicator, the product of the two measured values as obtained by means of a multiplicator representing a value that is proportionate to the cylinder output at this precise moment. However, this conventional instrument is not suitable for solving the existing problems either, since it only permits the monitoring of the output of a single cylinder of the engine at any given moment by the appropriate adjustment of the multipolar changeover switch, without offering a possibility of comparison with the remaining cylinders. Moreover, this apparatus lacks thermal control facilities.

It is the object of the present invention to avoid the shortcomings of conventional monitoring devices by providing a substantialy improved apparatus of this type permitting the continous monitoring of the aforesaid operating conditions of an internal combustion engine. According to the invention, the apparatus used for the monitoring of the mechanical stress due to the maximum pressure prevailing in the cylinders comprises a sensitive presure gauge with an amplifier, the outputs of which are consecutively and automatically connectable by means of a changeover switch to the input of the oscilloscope and selectively disconnectable from same, the oscilloscope being triggered at every revolution in the case of two-stroke engines or at every second revolution of the engine in the case of four-stroke engines, as a result of which the time-pressure history of all cylinders appears simultaneously on the screen of the oscilloscope. The changeover switchgear comprises a control element for each cylinder, preferably a stage of a ring counter, which at the beginning of each working cycle connects the sensitive pressure guage and amplifier belonging to the associated cylinder to the input of an oscilloscope on the one hand and releases a pulse for the synchronization of the lines of the oscilloscope, on the other hand. Thus the peak pressures are evaluated in a simple manner on the screen by comparing the pressure diagrams of individual cylinders with each other. If pressure distribution in one of the cylinders is a variance with the rest of the cylinders, it is possible to spot that particular cylinder by causing the pressure lines on the screen to fade consecutively by pressing a button. Since there is a specific connection between the characteristic pressure values and the thermal stress on the cylinder, the apparatus according to the invention makes it possible for any thermal overload to be discovered in time on the basis of the values measured. The connection between the measured pressures and the thermal stress on the internal combustion engine is of an indirect nature, since if irregular load distribution among the various cylinders occurs, for example owing to the failure of an ignition, this fact is revealed on the one hand, by the values measured, and on the other hand, by excessive thermal stress on the remaining cylinders. This is clearly shown on the screen of the oscilloscope so that the necessary remedy, such as the stopping of the internal combustion engine, can be applied forthwith.

For the purpose of measuring the mean indicated pressure and/or the mean pressure referred to the crank angle, a device is used according to the invention, which in a manner known per se comprises a single disk positively attached to the crankshaft and surrounded by a number, equalling that of the engine cylinders, of stationary pulse generators offset in relation to each other by 120 degrees for example, the said disk bearing on its periphery uniformly distributed marks or graduations corresponding to the piston travel, and a trigger mark independent from the former, opposite which another pulse generator is connected to the instrument for the determination of the mean indicated pressure, where each time a pulse is released by the mark via the pulse generators, the instantaneous value of the pressure is measured by the digital method and the individual values measured over a working cycle of the internal combustion engine are summed up under the control of the trigger mark. This design provides for a particularly high degree of accuracy.

Figure 2:
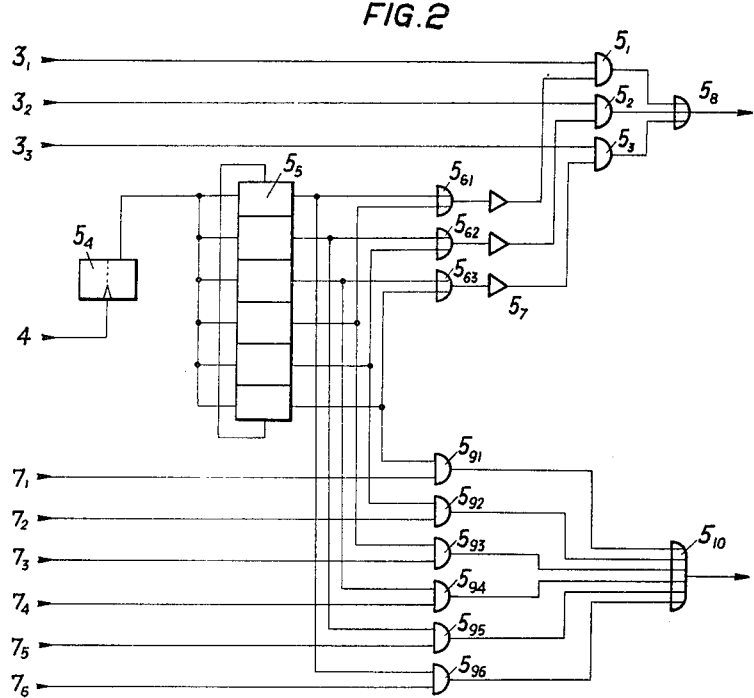
Figure 3:
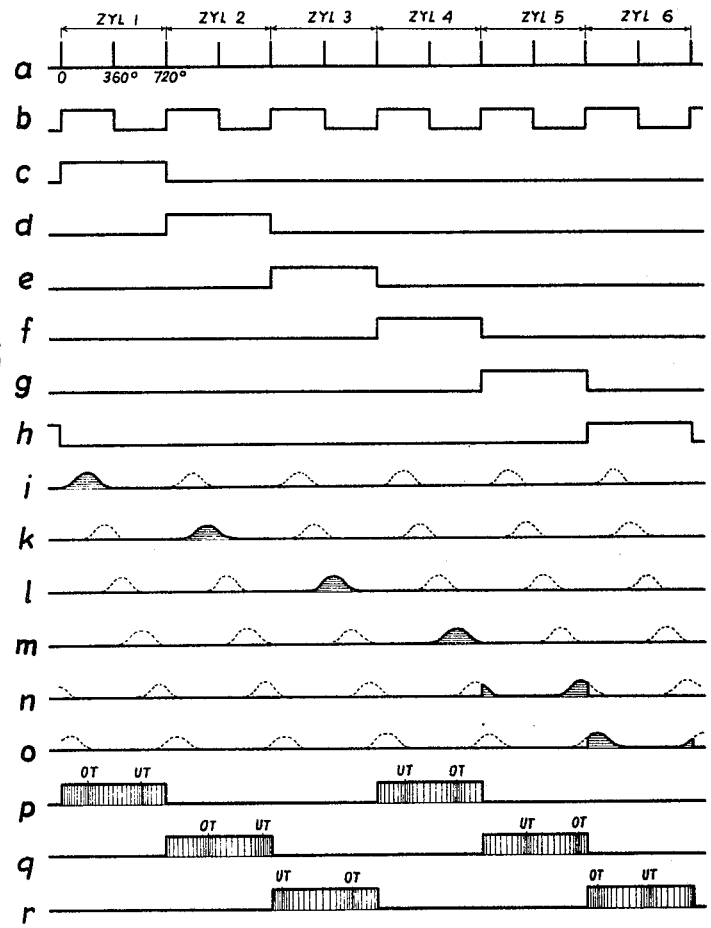
Figure 4:
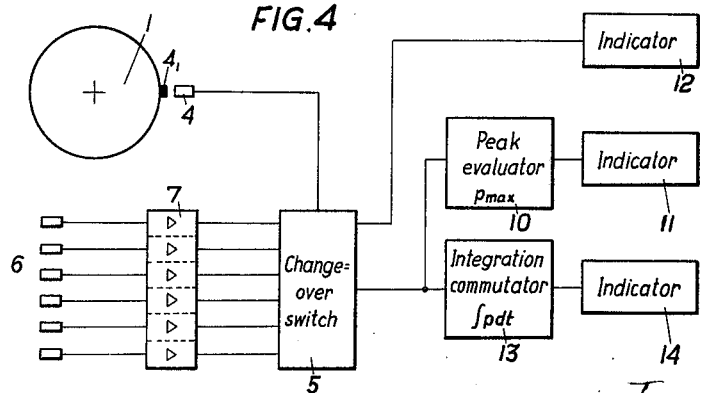
Figure 5:
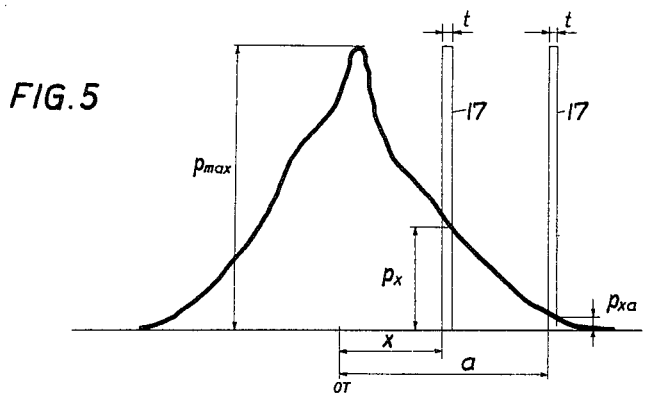
Figure 6:
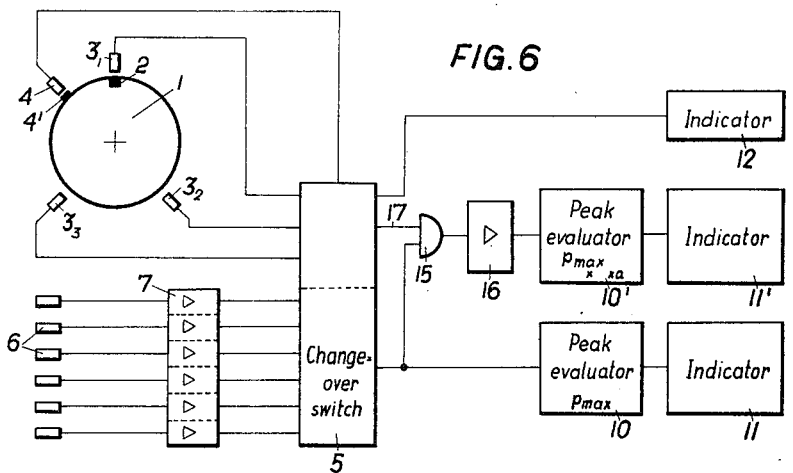
Figure 7:
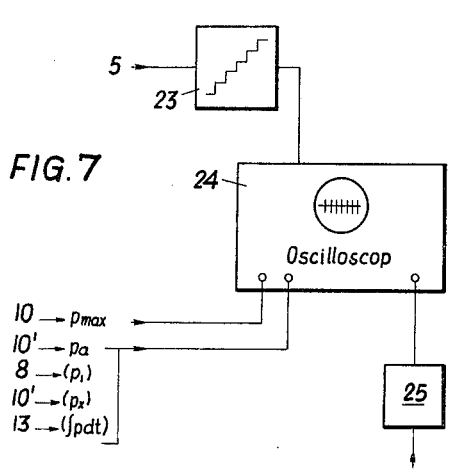
Figure 8:
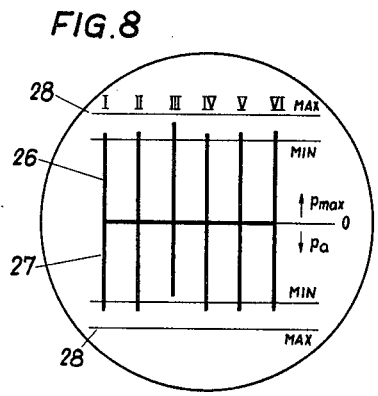
Figure 9:
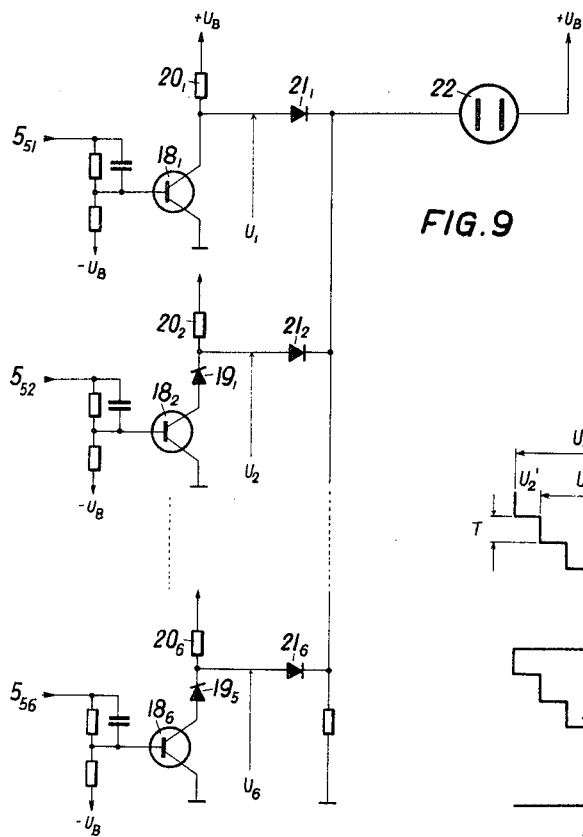
Figure 10:
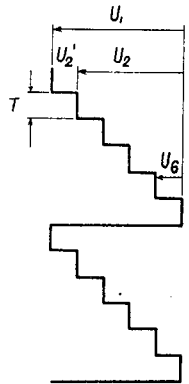
Figure 11:
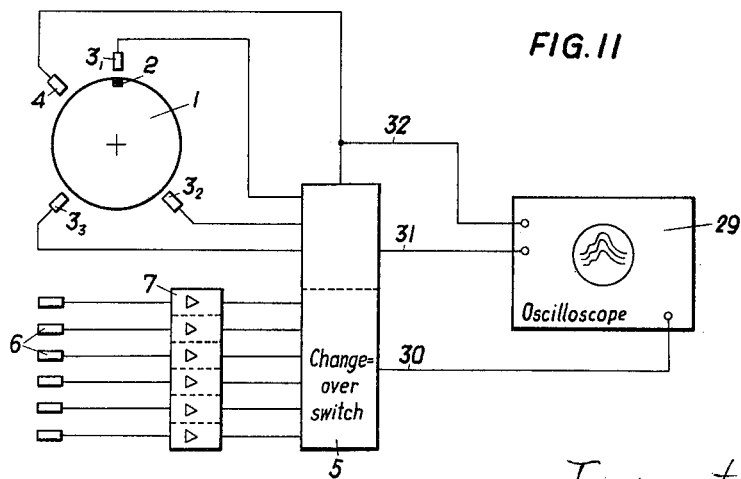

Further details of the invention will appear from the following description of several embodiments of the invention with reference to the accompanying drawings in which:

FIG. 1 shows a block wiring diagram of an apparatus according to the invention,

FIG. 2 a block wiring diagram of a detail of the invention,

FIG. 3 a pulse schedule explaining the operation of the apparatus shown in FIGS. 1 and 2 in greater detail FIG. 4 a block wiring diagram of another embodiment of the invention, FIG. 5 a pressure-time diagram explaining the other embodiment of the invention in greater detail, FIG. 6 the block wiring diagram of the latter embodiment of the invention, FIG. 7 the block diagram of an indicator according to the invention, FIG. 8 a detail of the embodiment of the invention shown in FIG. 7 on an enlarged scale, FIG. 9 a detail of circuitry of the indicator shown in FIG. 7, FIG. 10 a voltage diagram related to FIG. 9, and FIG. 11 a block wiring diagram of a further embodiment of the invention.

As appears from FIG. 1, a disk 1 is mounted on the engine to be tested, the said disk being positively attached to the crankshaft. The said disk bears a number of marks distributed over its periphery in such a manner that the distances between each of them correspond to equal piston travels of the cylinder. The pulses are preferably released by means of electromagnetic pulse generators $3_1$ to $3_3$. Photoelectric scanning is, however, also possible. FIG. 1 illustrates a circuitry for the monitoring of a six-cylinder four-stroke internal combustion engine, comprising three electromagnetic (or photoelectric) pulse generators offset in relation to each other by crank angles of 120 degrees each. These pulse generators 3 are connected to a changeover switchgear.

Each cylinder (there are six in the embodiment of the invention illustrated in the drawing) is provided with a preferably piezoelectric pressure pickup 6 connected with an amplifier of its own (for piezoelectric pressure pickups a charge amplifier is used). The outputs of the amplifiers are connected to the changeover switchgear 5.

The changeover switchgear 5 serves for the passage of the two measured values for any one cylinder to the evaluating, measuring or indication element, in each case for a crank angle of 720 degrees (for a four-stroke engine). That means that the channel comprising the pressure pickup 6 and the amplifier 7 associated therewith, is directly connected to the evaluating and measuring circuit 8, 9, 10, 11, hereafter described in greater detail, without being affected by the values of the remaining cylinders. This also applies to the channel comprising disk 1, marks 2, pulse generator $3_1$. The latter is connected to the measuring and evaluating circuit 8, 10.

The changeover switch 5 serves the following purpose (see FIGS. 2 and 3): Determination of the association of the two channels of each pair of values to be determined, without any influence due to the value of the other cylinders. That means that for the monitoring of the maximum pressure and of the mean indicated pressure, the pressure-measuring channel 6, 7 of the cylinder is connected to a peak-value measuring instrument 10 of a type known per se, comprising in its plainest design a capacitor chargeable by means of a diode, on the one hand, and to the input of the instrument 8 for the determination of the mean indicated pressure from the pressure distribution above the piston travel on the other hand. Furthermore, this instrument should be supplied for integration also with the travel or path in the shape of marks obtained by means of the arrangement 1 to 3.

Each of the three pulse generators $3_1$ to $3_3$ shown in FIG. 1 is connected to the input of an AND-gate $5_1$ to $5_3$, respectively. Where electromagnetic pulse generators are used, the pulses to be released to the said AND-gate are previously transformed into rectangular pulses of a constant amplitude and duration.

In addition to the marks 2 hereabove described a trigger mark 4' independent from the former and an associated pulse generator 4 are provided on the disk 1. This pulse generator 4 releases one pulse mark for every revolution (all 360° crank angle) of the engine to be monitored. These pulses are released to the input of a bistable switch step $5_4$ tripping after every second revolution of the monitored engine (every 720 degrees crank angle) in the same position (see FIG. 3b). The output of the bistable switch step $5_4$ is connected to the control line of a multi-stage (in the present instance of a six-cylinder engine, of a six-stage) ring counter $5_5$ comprising series-connected bistable stages similar to a shifting register, the last stage being connected to the first. For the monitoring of two-stroke engines the bistable switch step $5_4$ is not required, the ring counter $5_5$ being stepped on each revolution of the engine. The outputs of the first and fourth stages of the ring counter $5_5$ are connected to the OR-gate $5_{61}$, the second and fifth outputs to the inputs of the OR-gate $5_{62}$ and the outputs of the third and sixth stages to the input of the OR-gate $5_{63}$. The outputs of the OR-gates $5_{61}$ to $5_{63}$ are connected to the associated second inputs of the aforesaid AND-gate $5_1$ each with the interposition of an impedance transformer stage $5_7$. The outputs of the AND-gates $5_1$ to $5_3$ are connected to the three inputs of an OR-gate $5_8$.

As appears from FIG. 3 $p$, $q$, $r$, the piston travel marks associated with the cylinder appear at the output of this OR-gate $5_8$ for the duration of two revolutions of the monitored engine. The applicable association is decided upon by appropriately selecting the proper pulse generator $3_1$ to $3_3$ accommodated in accordance with the associated cylinder. Therefore, a single disk 1 with the piston travel marks 2 only is required, the switch to the next pulse generator being effected following two revolutions of the engine (after 720 degrees crank angle). Thus the pulse generator $3_1$ is switched on for the first two revolutions, the pulse generator $3_2$ for the next two revolutions and so forth. As a result, the piston travel marks for 720 degrees crank angle as shown in FIGS. 3$p$ to 3$r$ are obtained each time at the output of the OR-gate $5_8$, the dead center coinciding with the associated cylinder, as indicated in FIG. 3$p$ to 3$r$ by a darker shade for the top and bottom dead center, since the pulse marks are following each other in rapid succession in these areas.

As appears from FIG. 2, the outputs of the six amplifiers $7_1$ to $7_6$ in FIG. 1 are connected each to an input of an AND-gate $5_9$. The second inputs of these AND-gates are connected to the associated outputs of the ring counter $5_5$ and the outputs of the AND-gates $5_{91}$ to $5_{96}$ are connected to the inputs of an OR-gate $5_{10}$. At the output of each AND-gate $5_9$ the pressure curve of the associated cylinder (FIGS. 3$i$ to 3$c$) appears, provided the output of the associated stage of the ring counter $5_5$ is open (see rectangular pulses in FIGS. 3$c$ to 3$h$). Thus the pressure curves of all cylinders are obtained consecutively at the output of the OR-gate $5_{10}$.

On the one hand, the pressure curve is delivered to a conventional peak evaluation circuit 10 and on the other hand to the circuit for the determination of the mean indicated pressure, the associated piston travel marks (supplied by the changeover switchgear 5) being additionally required for this circuit, as is a control pulse of the electromagnetic pulse generator 4 for each revolution, with the interpolation of an appropriate control circuit.

The outputs of the two measuring and evaluating circuits 8 and 10 are connected each to an indicator 9 and 11, respectively. The indicator may be either of the analog or preferably of the digital type. The latter offers the possibility of connecting a printer to the unit. When using an analog indicator, it is, however, also possible to connect a multicolor recorder, colors being switched as required for one cylinder at a time by means of the changeover switchgear 5. According to another feature of the invention, a plain indicating system 12 can also be provided which is controlled by means of the changeover switchgear 5 and indicates the cylinder being measured by digital representation.

The fully automatic changeover switchgear 5 for the continuous monitoring of the engine, wherein depending on the number of cylinders each cylinder is monitored continuously after an interval which equals the number of cylinders, can be replaced by a plain changeover switchgear in the shape of a changeover switch for manual or automatic operation at adequate intervals by remote control, any one cylinder being monitored as long as the changeover switch rests on the preselected channel.

Another variant of the monitoring system consists in the determination of the maximum value and of the integral $\int pd\alpha$ or approximately $\int pdt$. The method using the integral $\int pd\alpha$ produces a circuitry of the structure hereabove described (see also FIGS. 1 to 3), except that the graduation of the marks 2 in FIG. 1 is linear.

A particularly simple circuitry is obtained by using the integral $\int pdt$, thereby simplifying the circuit (as shown in FIG. 4) to such an extent that a single trigger mark 4' with the associated pulse generator 4 will suffice. Accordingly, the AND-gates $5_1$ to $5_3$, the OR-gates $5_{61}$ to $5_{63}$, the impedance transformer $5_7$ and the OR-gate $5_8$ are no longer required for the changeover switchgear 5. The output of the OR-gate $5_{10}$ and consequently, the pressure associated with the cylinder are delivered in this circuit to a conventional peak evaluating circuit 10 on the one hand, and to an integrating circuit 13 on the other hand. In a similar manner as hereabove described, readings are provided by the indicator 11, 12 and 14.

Again as hereabove described, with this circuit too, the switchover from one cylinder to the next can be manual, automatic or remote-controlled by means of a changeover switch.

Another method of determining the operating condition of diesel engines consists in determining in addition to the maximum pressure $p_{max}$, as a second value the final expansion pressure before the beginning of the discharge $p_{xa}$ or a pressure $p_x$ of the expansion line following the combustion, that is, approximately in the center of the expansion line at a point defined with regard to the crank angle (see FIG. 5).

An example of a circuitry meeting these requirements is schematically illustrated in FIG. 6 and will be described hereafter in greater detail. As with the embodiment of the invention shown in FIG. 1, the pressure channel comprises an equal number of pressure pickups 6 as there are cylinders in the engine, with their associated amplifiers 7. The outlets of these amplifiers 7 are connected to a changeover switchgear 5. The design of the latter is as hereabove described with reference to FIG. 2. However, in contrast with the circuit shown in FIG. 1, the trigger disk 1 bears a single trigger mark 2 only. The ring counter $5_5$ in FIG. 2 is controlled by means of a trigger mark 4' via the pulse generator 4 and the bistable switch step $5_4$. The trigger mark 2 is set in such a manner that a pulse is released exactly at a crank angle $x$ or $a$ (FIG. 5) as referred to the top dead center. Following its transformation into a rectangular pulse 17 of a constant amplitude and a constant duration $t$ (see also FIG. 3), this pulse is delivered via the changeover switchgear 5 to one input of an AND-gate 15. The duration $t$ of the rectangular pulse 17 has been selected in such a manner that the amplitude of the pressure curve has not dropped noticeably. The amount of the rectangular pulse 17 should be greater than the expected amplitude $p_x$ or $p_{xa}$ of the pressure (see also FIG. 5). At the output of the AND-gate 15 the pressure amplitude $p$ or $p_{xa}$ appears and is amplified in the following amplifier 16 (see FIG. 6) so as to attain a value that is suitable for indication. In the following peak value evaluation circuit 10' this amplitude is measured and indicated by means of the indicator 11'. The rest of the system, such as measurement and indication of maximum pressure and indication of the cylinder being monitored, is as with system 1.

Obviously it is also possible for the changeover switchgear 5 to be operated by hand, automatically or remote-controlled.

A circuitry as shown in FIGS. 7 and 8 provides an extremely neat grouping. The two values to be measured (maximum pressure and mean indicated pressure $pi$ and/or means pressure per unit of time, or expansion end pressure $p_{xa}$ or pressure $p_x$) are delivered to the two inputs of a double-beam oscilloscope or of a single-beam oscilloscope with an electronic changeover switch. To the X-plates of the oscilloscope a staircase-wave generator 23 controlled by the ring counter $5_5$ and comprising a number of steps equal to the number of cylinders of the monitored engine is connected. The duration T of a step (see FIG. 10) equals the duration of one or two revolutions of the engine, as the case may be. For the duration T the electron beam of the oscilloscope is not deflected and the monitored value appears on the screen in the shape of a vertical line 26 or 27 as shown in FIG. 8. At the next staircase-wave jump the beam is deflected at very great speed in the direction X for a certain constant amount and remains in that position for the duration T. The values for the next cylinder are indicated in a similar manner in the shape of vertical lines. This system provides a clear picture of the two values to be monitored with a distinct separation for each individual cylinder.

With this circuit, the maximum amplitude is very easily recognizable. For low-speed engines a screen having a correspondingly long afterglow duration (persistence) should be used. The conventional peak value evaluating circuits 10 and 10' are not required since the maximum value is directly readable, although they provide a difference in the specific luminous intensities of the line.

For the clear control of the values the admissible limits "MAX" and "MIN" are preferably arranged in the shape of horizontal lines 28 as shown in FIG. 28 on the screen. Provided these limits are constant, these lines may be provided in the shape of a illuminated scan. When the limits are altered, such as for example, as a function of the lead, these horizontal lines are written on the screen by means of an electron beam, the amplitude being automatically altered by means of a control 25 as a function of the value determining the limit.

A particularly simple type of staircase-wave generator is illustrated in FIG. 9. In this circuit, the outputs of the individual stages of the ring counter $5_{51}$ to $5_{56}$ are connected to the inputs of an equal number of switch steps. These switch steps comprise a transistor 18 the base of which is connected in the usual way to a resistance-capacity combination. In the collector circuit, a resistance $20_1$ and in all of the following steps a resistance $20_2$ to $20_6$ is series-connected to a Z-diode $19_1$ to $19_5$. The Z-voltage is selected in such a manner that it diminishes by the same amount from one step to the next. The junctions between the resistances 20 and the Z-diodes 19 are connected to an X-plate of the oscilloscope by means of a diode arrangement. The positive feed voltage $+U_B$ is applied to the X-plate.

When these stages are switched on step-by-step by means of the ring counter $5_5$, a stepped voltage curve as shown in FIG. 10 appears on the X-plates of the oscilloscope. This circuit can be arranged in a similar manner for any number of cylinders.

FIG. 11 schematically shows another monitoring method determining a single value only, as distinct from the method hereabove described. This method is based on the fact that if the pressure curve of each cylinder is available, monitoring is provided by the fact that the pressure curves are compared with one another on the screen of an oscilloscope. The pressure curves can be recorded either one below the other or preferably one on top of the other, any deviation from the mean value being immediately discernable.

With this circuitry (see also FIG. 11) the pressure measuring signal 6, 7 is of the same design as with the preceding one. However, the output voltages 30 of the amplifiers 7 are delivered directly to the Y-input of an oscilloscope 29 after passing the changeover switchgear 5. The trigger disk 1 comprises a single trigger mark 2 only. By means of the pulse generator 4 the shifting register $5_5$ is controlled on the one hand, and on the other hand, this pulse 32 serves for the picture synchronization of the oscilloscope. The pulses 31 released by the pulse generators 3 and arranged by means of the changeover switchgear 5 according to the number of cylinders serve for the line synchronization of the oscilloscope provided an appropriate conventional special type featuring a line-offset scan is used for this purpose. Where standard-type oscilloscopes are used, a free-running sweep equipment, triggered by means of the pulses 31 is employed. No synchronizing pulses 32 are required. The individual pictures all have the same base line. By the continuous adjustment of amplification of the amplifiers 7 all output voltages can be brought to the same value.

With this circuitry too, the changeover switchgear 5 can be operated by hand automatically or remote-controlled.

With all of the arrangements hereabove described, determination of boundary values accompanied by signalling or simultaneous stopping of the engine is possible.

The exhaust temperature can also be used as a second measured value. For that purpose the temperature is preferably recorded directly on a multicolor recorder via thermocouples and measuring amplifiers. Consecutive recording via a changeover switchgear 5 is also possible. For the determination of the second value, the latter should be enlarged by the provision of a number of AND-gates $5_9$ depending on the number of cylinders and OR-gate $5_{10}$. Control is effected by means of the ring counter $5_5$.

By means of an appropriate apparatus these monitoring devices can be checked in such a manner that for example, the quartz-type pressure transducers are impinged upon by a pressure rising rapidly to a specific maximum, thereafter dropping rapidly to the level of the outside pressure. This is possible by the simultaneous impingement of all of the quartz-type pressure transducers by means of a three-way valve connected to a wide delivery pipe. For this check the quartzes should be switched off the cylinder by means of a valve. The valve can also serve to temporarily switch the quartz-type pressure transducers off the cylinder chamber for the purpose of reducing wear.

We claim:
1. An apparatus for monitoring the mechanical and thermal stresses on the cylinders of internal combustion engines and of the uniform distribution of the load of their cylinders, comprising a sensitive pressure gauge and an amplifier for each cylinder, the said amplifier being connected to the sensitive pressure gauge, and further comprising a changeover switchgear connected to the outputs of the said amplifiers, an oscilloscope connected to the said changeover switchgear, the latter connecting the input of the oscilloscope consecutively with the output of each of the said amplifiers, a device for the non-recurrent triggering of the oscilloscope for each cycle of the internal combustion engine, thereby showing the time-pressure history of all cylinders simultaneously on the screen of the oscilloscope, the said changeover switchgear comprising for each cylinder a control element for the establishment of the aforesaid connection between the input of the oscilloscope and the output of one of the said amplifiers at the beginning of each cycle of the internal combustion engine as well as for the release of a pulse for the synchronization of the lines of the said oscilloscope.

2. An apparatus according to claim 1, comprising a ring counter the stages of which form the said control elements associated with the individual cylinders of the internal combustion engine.

3. An apparatus according to claim 2, comprising a number of AND-gates equalling the number of cylinders, one input each of the said AND-gates being connected to the output of one of the said amplifiers, the other input of the AND-gate being connected to the output of one of the stages of the said ring counter, an OR-gate connected to the said AND-gates, the inputs of the OR-gate being connected to the outputs of the said AND-gates.

4. An apparatus according to claim 1, comprising a disk positively attached to the crankshaft of the said internal combustion engine, a number of pulse generators arranged in equally spaced relation to each other around the said disk, the number of pulse generators equalling the number of cylinders of the internal combustion engine, a number of marks distributed over the periphery of the said disk, a trigger mark provided on the said disk, a trigger pulse generator located beside the disk and operated by means of the said trigger mark, an instrument for the determination of the mean indicated pressure, the said trigger pulse generator being connected to this instrument measuring the instantaneous value of the pressure by the digital method when a pulse is released by the said mark by means of the said pulse generators, and summing up the various pressures as measured over a cycle of the internal combustion engine, controlled by pulses released by the said trigger pulse generator.

5. An apparatus according to claim 1, providing an AND-gate connected to the output of the said changeover switchgear, a disk positively attached to the crankshaft of the internal combustion engine, a mark located on the periphery of this disk, a number of pulse generators equalling the number of cylinders and arranged in equally spaced relation to each other on the periphery of the said disk, the pulses of the said pulse generators produced by the said mark being supplied as control pulses to the second input of the said AND-gate, an amplifier for measuring range adaption connected to the said AND-gate, a peak-evaluation circiut connected to the output of the said amplifier.

6. An apparatus according to claim 5, wherein the said peak-evaluation circuit consists of a capacitor and a diode for charging the said capacitor.

7. An apparatus accordng to claim 5, wherein the said peak-evaluation circuit consists of an operation aamplifier coupled by means of a diode.

8. An apparatus according to claim 1, comprising a two-beam oscilloscope, a staircase-wave generator, the number of staircase-waves of the said generator equalling the number of cylinders of the internal combustion engine, the said staircase-wave generator being advanced by one step each in the course of one cycle of the internal combustion engine and controlling the X-deflecting plates of the said two-beam oscilloscope, the outputs of the measuring devices for the two measured values of the internal combustion engine to be monitored being connected each to one of the two inputs of the said two-beam oscilloscope.

References Cited

UNITED STATES PATENTS

| 2,085,203 | 6/1937 | Schlesman et al. | 73—115 |
| 2,349,560 | 5/1944 | Reijnst | 73—115 |
| 3,389,599 | 6/1968 | Beale | 73—115 |

JERRY W. MYRACLE, Primary Examiner